United States Patent
Cai

(10) Patent No.: US 8,099,516 B1
(45) Date of Patent: Jan. 17, 2012

(54) PROTOCOL INDEPENDENT MULTICAST DESIGNATED ROUTER ENHANCEMENTS FOR SUPPORTING INTERNET GROUP MANAGEMENT PROTOCOL IN A MULTI-ACCESS NETWORK

(75) Inventor: Xiangrong Cai, Billerica, MA (US)

(73) Assignee: Avaya Inc., Basking Ridge, NJ (US)

( * ) Notice: Subject to any disclaimer, the term of this patent is extended or adjusted under 35 U.S.C. 154(b) by 2588 days.

(21) Appl. No.: 10/784,757

(22) Filed: Feb. 23, 2004

(51) Int. Cl.
*G06F 15/16* (2006.01)

(52) U.S. Cl. ........ 709/245; 709/246; 709/212; 709/217; 717/100; 398/43; 398/140

(58) Field of Classification Search ............... 709/245, 709/246, 212, 217; 398/43, 100; 717/100
See application file for complete search history.

(56) References Cited

U.S. PATENT DOCUMENTS

| | | | | |
|---|---|---|---|---|
| 6,208,647 B1 * | 3/2001 | Deng et al. | ............... | 370/390 |
| 6,331,983 B1 * | 12/2001 | Haggerty et al. | ............ | 370/400 |
| 6,847,638 B1 * | 1/2005 | Wu et al. | ..................... | 370/389 |
| 7,233,987 B2 * | 6/2007 | Watkinson | ................... | 709/223 |

* cited by examiner

*Primary Examiner* — Don Wong
*Assistant Examiner* — Tuan-Khanh Phan
(74) *Attorney, Agent, or Firm* — Anderson Gorecki & Manaras LLP

(57) ABSTRACT

A method and apparatus is disclosed by which IGMP Host messaging is translated to PIM messaging for the purposes of efficiently and accurately maintaining group membership data in a multicast network.

16 Claims, 9 Drawing Sheets

US 8,099,516 B1

PROTOCOL INDEPENDENT MULTICAST DESIGNATED ROUTER ENHANCEMENTS FOR SUPPORTING INTERNET GROUP MANAGEMENT PROTOCOL IN A MULTI-ACCESS NETWORK

FIELD OF THE INVENTION

This invention relates generally to the field of multicast networking and more particularly to a method and apparatus enabling seamless interaction between Protocol Independent Multicast Routers and Internet Group Management Protocol Hosts.

BACKGROUND OF THE INVENTION

As is known in the art, multicasting is a technique by which a sender can forward data to multiple members of the group using a single data transmission. Extensions to the Internet Protocol to support multicasting are described in IEEE RFC 1112, "Host Extensions for IP Multicasting", by Deering, 1989, and RFC 2236 "Internet Group Management Protocol, Version 2", 1997, by Fenner.

In general, Deering and Fenner describe that IP multicasting is the transmission of an IP datagram to a "host group", a set of zero or more hosts identified by a single IP destination address. The membership of a host group is dynamic, and at any time it may include different host members. In addition, a host group may be permanent or transient. A permanent group has a well-known, administratively assigned IP address. Those IP multicast addresses that are not reserved for permanent groups are available for dynamic assignment to transient groups which exist only as long as they have members.

For purposes of clarity, a network will be described to include at least one host and at least one 'multicast router.' Each host and/or multicast router may also be an internet gateway capable of transmitting data from a local network to other coupled networks. In general, a host transmits an IP multicast datagram as a local network multicast which reaches all immediately-neighboring members of the destination host group. If a neighboring multicast router is not a member of the group, the multicast router forwards multicast messages to the other members of the multicast group. As mentioned above, the multicast router may be co-resident with, or separate from, the internet gateway. Thus, the forwarding of the packet to the other members of the group may include forwarding the packet out of the local network to a neighboring network via the internet gateway by either the host or the multicast router.

Hosts that seek to participate in multicasting implement Internet Group Management Protocols (IGMP). A host may be coupled to one or more networks via different network interfaces. For each group communication, a host specifies the network interface over which communications with the group will be forwarded. According to the IGMP protocol, a host joins a group by issuing a Report request, indicating the group address and the network interface of the host associated with communications for the group. A host leaves a group by issuing a Leave (or Release) request, using the group address and network interface associated with the group. The Leave request causes the host to give up its membership in the host group identified by the group address on the identified network interface.

Each host maintains a list of host group memberships associated with each network interface. An incoming datagram destined to one of those groups is processed the same way as datagrams destined directly for the host. Periodically, IP hosts report their host group memberships to neighboring devices. Multi-cast routers send Host Membership Query messages (or Queries) to discover which host groups have members on their attached local networks. Hosts respond to a Query by generating a Host Membership Report (hereinafter Report) reporting each host group to which they belong on the network interface from which the Query was received. The Report is sent periodically, as a multicast transmission to the host group address being reported, to enable all other members in the same group on the same network to hear the Report. In one currently implemented embodiment, Queries are issued every 60 seconds.

As mentioned above, multicast group members need not all reside in the same local area network. Thus, groups may span wide-area internets, with certain members of the group being communicated with via the internet gateway. An efficient method for routing multicast groups that span wide-area networks is referred to as Protocol Independent Multicasting (PIM).

In general, PIM seeks to reduce the number of multicast messages being forwarded through a network by identifying the best multicast paths for routing transmission to the destinations. In a PIM network, certain functionality is consolidated at defined devices. One defined device is a Rendez-Vous Point (RP). Each multicast group has a shared tree via which receivers hear of new sources and new receivers hear of all sources. The RP is the root of the per-group shared tree, called the RP tree, and in essence identifies the routing paths to each members of the group.

A Designated Router (DR) in a PIM network is router that sends multicast group membership commands (such as the PIM Join and PIM Prune commands) to the Rendez-vous Point (RP) on behalf of neighboring devices. The DR may be, for example, a router located at the internet gateway of a local network, which is used to forward multicast messages over the gateway.

Thus, IGMP provides a protocol that allows hosts to identify group membership to Querying routers through a combination of Reports and Leave commands. In addition, PIM provides a protocol by which group membership can be collected by a DR and forwarded to a Rendezvous Point using PIM Join and PIM prune commands. In typical IP environments, routers should include hardware to support both protocols. Different vendors use different mechanism to maintain consistency between the two protocols.

One mechanism that is often used will now be described with reference to the exemplary network 10 of FIG. 1. Network 10 is shown to include a multicast router, which is also a PIM Designated Router (DR) 12 coupled to an IGMP Host 14 and PIM router 16. The DR 12 periodically receives Report and Leave/Release commands from the IGMP Host 14, and Join and Prune commands from the PIM router 16.

Assume that PIM router 16 is a member of a group A that receives transmissions from Source 18 via an network interface. When the PIM router 16 wants to exit the group, it issues a PIM prune to the upstream neighbor. In a network with only PIM routers, the prune could be forwarded to the Rendezvous point. However, because the DR is also coupled to the IGMP Host, the DR should wait until the next Report is forwarded from the IGMP Host. If the Report shows that the IGMP Host is a member of group A, the DR will suppress the Prune from being forwarded to the Rendez-vous point. Because the time period between reports is generally defined to be sixty seconds, in order to consistently support both the IGMP and PIM protocols, some DRs suppress prunes for a time period in excess of sixty seconds to ensure that an interface that is going to be needed to support the IGMP Host is not prematurely pruned. Such a delay is undesirable. It would be desirable to identify a mechanism that would permit IGMP and PIM to be jointly supported without the added delays of the prior art.

SUMMARY OF THE INVENTION

According to one aspect of the invention, a method of maintaining consistent group membership data at a Designated Router executing the Protocol Independent Multicast (PIM) protocol includes the steps of receiving, at the Designated Router, an IGMP membership message from a host device operating according to the Internet Group Management Protocol (IGMP) protocol, translating the IGMP membership message into a PIM membership message and forwarding the PIM membership message to a device upstream from the Designated Router. According to one embodiment, an entry in a PIM routing table is generated for any IGMP Report requests received from downstream IGMP Hosts. According to another embodiment, an entry in a PIM routing table is deleted for any IGMP Leave message received from downstream IGMP hosts. By translating IGMP messages directly to PIM protocol messages, and appropriately forwarding the translated PIM messages over appropriate interfaces, both IGMP and PIM protocols can be supported without the delays incurred by prior art implementations.

DETAILED DESCRIPTION

The present invention provides a method and apparatus by which IGMP Host messaging is translated to PIM messaging for the purposes of efficiently and accurately maintaining group membership data in a multicast network.

Figure 1:
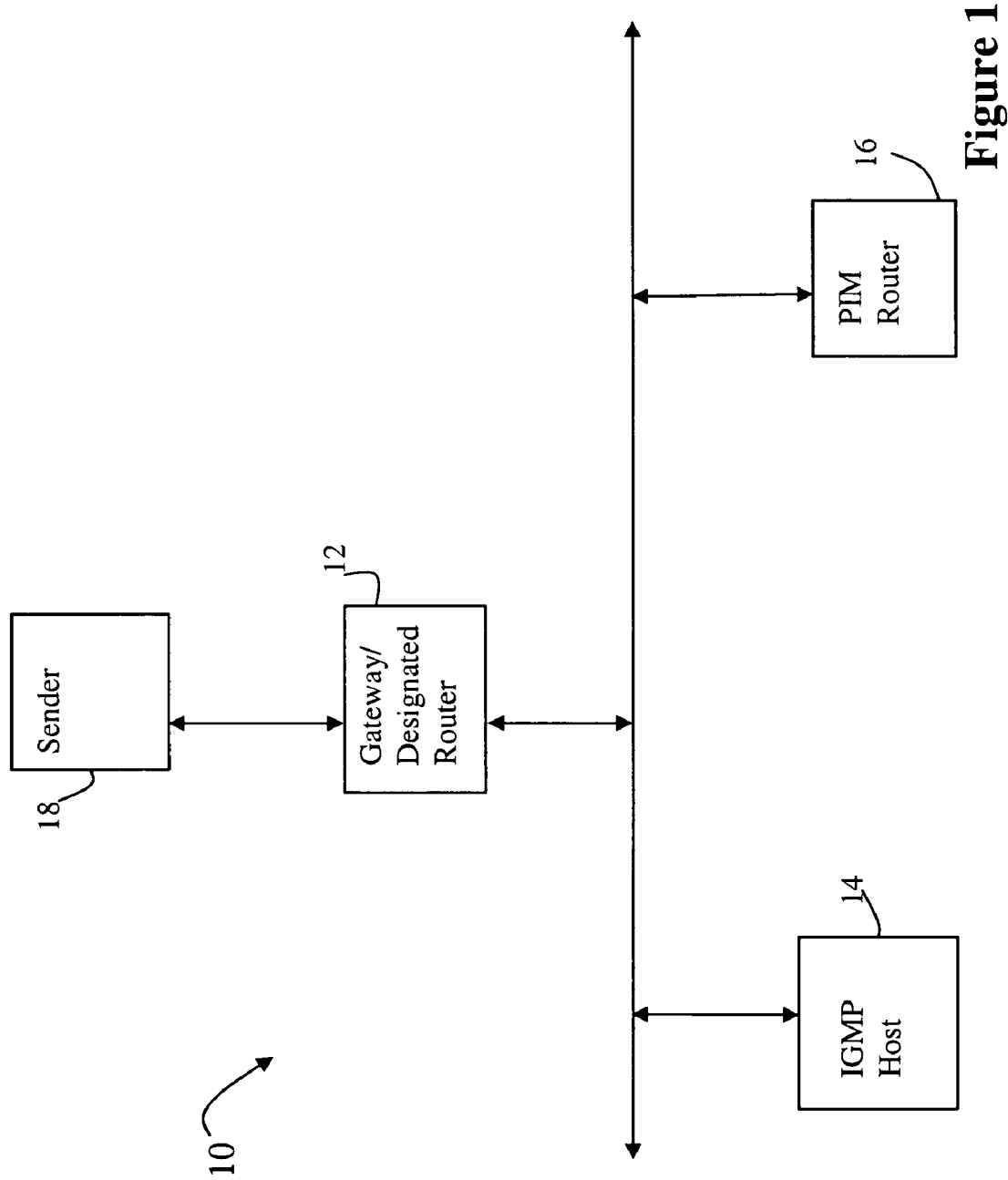
FIG. 1 is a block diagram of a multi-access network for the purposes of general description of the problems with correlating Protocol Independent Multicast (PIM) protocol, and Internet Group Management Protocol (IGMP)
Figure 2:
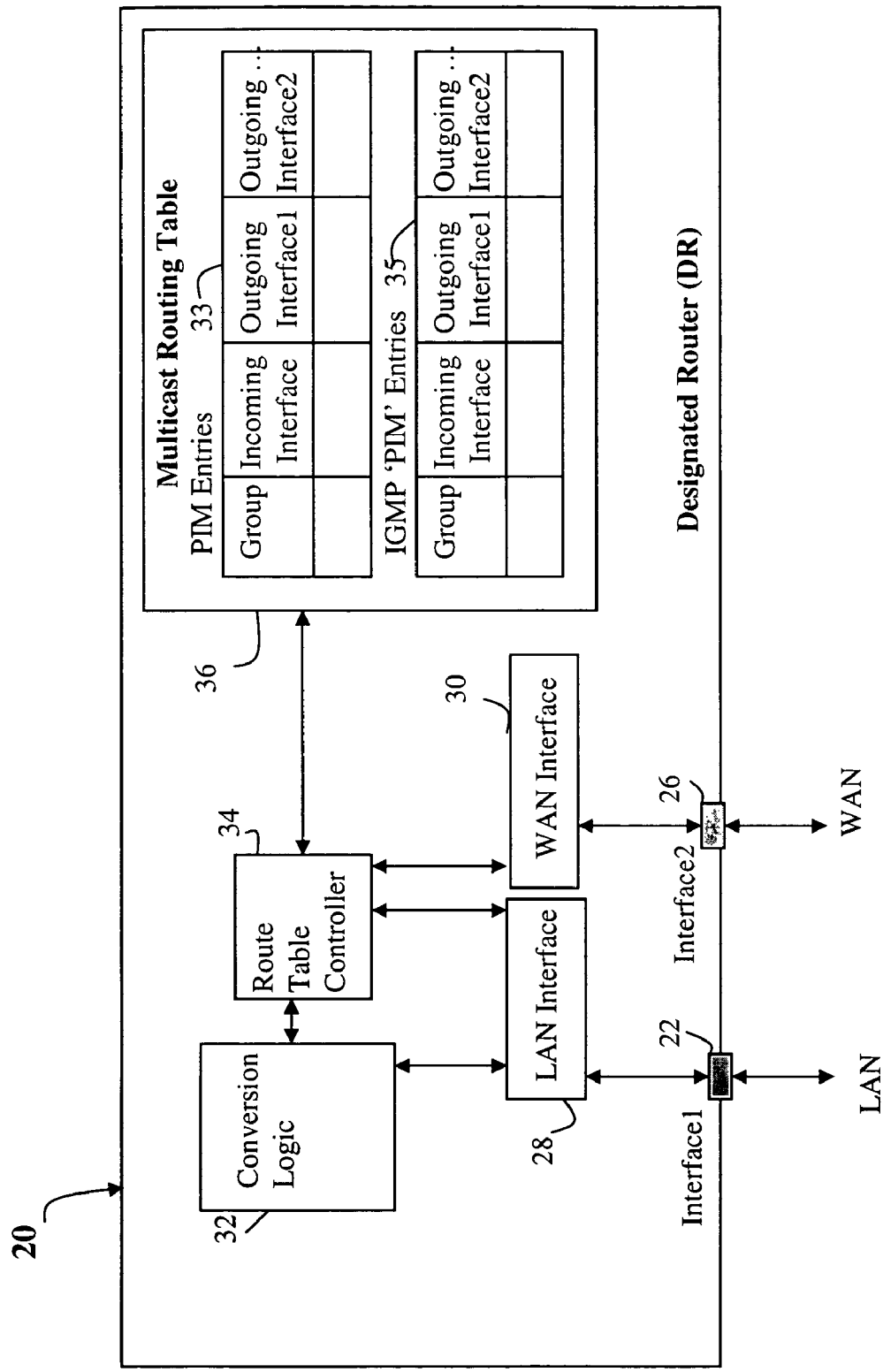
FIG. 2 is a block diagram illustrating exemplary components that may be included in a PIM Designated Router (DR) capable of integrating IGMP and PIM protocols according to the principles of the present invention.

Referring now to FIG. 2, a block diagram of a Designated Router 20 is shown. The Designated Router 20 is a selected router in a network operating according to the Protocol Independent Multicast (PIM) protocol. In general, a DR sets up multicast route entries and send corresponding Join/Prune and Register messages on behalf of directly connected receivers and sources. A DR may or may not be the same router as an Internet Group Management Protocol (IGMP) Querier router, who seeks reports from connected IGMP Hosts. However, for the purposes of this invention, the DR includes logic to appropriately process IGMP Report and Leave messages.

As shown in FIG. 2, the DR includes a number of interfaces, including a Local Area Network (LAN) interface 22 and a Wide Area Network (WAN) interface 24. Although only one LAN interface port 22 and WAN interface port 24, it is understood that routers typically include multiple interface ports, for connecting to multiple different networks, and the router includes logic for appropriately forwarding commands and data to the devices on the various networks via the interface ports. LAN interface logic 28 and WAN interface logic 26 control the flow of data between router control functionality and the interface ports.

The DR of the present invention is shown to include Conversion Logic 32, Route Table Controller 34 and a Multicast routing table 36. The Conversion Logic operates to selectively translate received IGMP group membership commands into PIM group membership commands, where 'group membership' commands include any messages that control the addition, deletion or modification of membership information for a given group. The Route Table Controller 34 is used to read, write and modify contents of the Multicast Routing table 36. For example, the route table controller controls the addition and deletion of entries in the routing table.

According to one embodiment of the invention, the multicast routing table includes Protocol Independent Multicast (PIM) entries, such as entry 33. A route entry is a state maintained in a router along the distribution tree and is created and updated based on incoming control messages. In particular, each PIM multicast routing entry includes source specific route entries, identifying a source of a multicast group message, and a group to which the multicast message is to be distributed. Generally the route entry specifies at least one incoming interface (iif), and at least one outgoing interface (oif). The incoming interface indicates the interface from which multicast data packets are accepted for forwarding, and is initialized when the entry is created. The outgoing interface (s) are those interfaces over which outgoing multicast messages for the (source, group) [(s,g)] pair should be forwarded.

In general, PIM entries are created in response to the receipt of PIM Join messages. However, according to one embodiment of the invention, PIM entries are also created and deleted in response to receipt of IGMP Host messages. An indication is provided, in the PIM routing table, that the PIM entry is associated with IGMP Host messages. In the embodiment of FIG. 2, two discrete PIM entries are provided, one for storing PIM entries associated with PIM commands, and the other for storing PIM entries associated with IGMP commands. However, alternative embodiments in which one table is provided, with flags indicating the respective source of the commands, are also envisioned and the present invention is not limited to any manner in the selection of mechanism for storing the translated PIM entries.

By including PIM entries within the DR that reflect the present state of the IGMP Host membership, a DR can more readily ascertain remaining group membership, without having to wait out periodic reports from the IGMP Hosts. As a result, the DR can quickly ascertain remaining group membership in the event of a received Join or Prune commands, and immediately forward the commands upstream as needed. It should be noted that the present invention also includes optimizations that intelligently analyze the contents of the PIM entries to reduce unnecessary group message forwarding, thereby further optimizing the performance of the DR.

The various processes that may be undertaken within the DR to manage the PIM entries and group message forwarding will now be described with reference to FIGS. 3-8. In addition, for each process, an example of the processing operation will be described with regard to the block diagram of a multi-access network provided in FIG. 9. For the purposes of the description, the term 'upstream' shall mean, from the point of view of the Designated Router, upstream towards the sending device (a multicast source). Downstream shall mean downstream to the receiving device (a multicast receiver).

Figure 3:
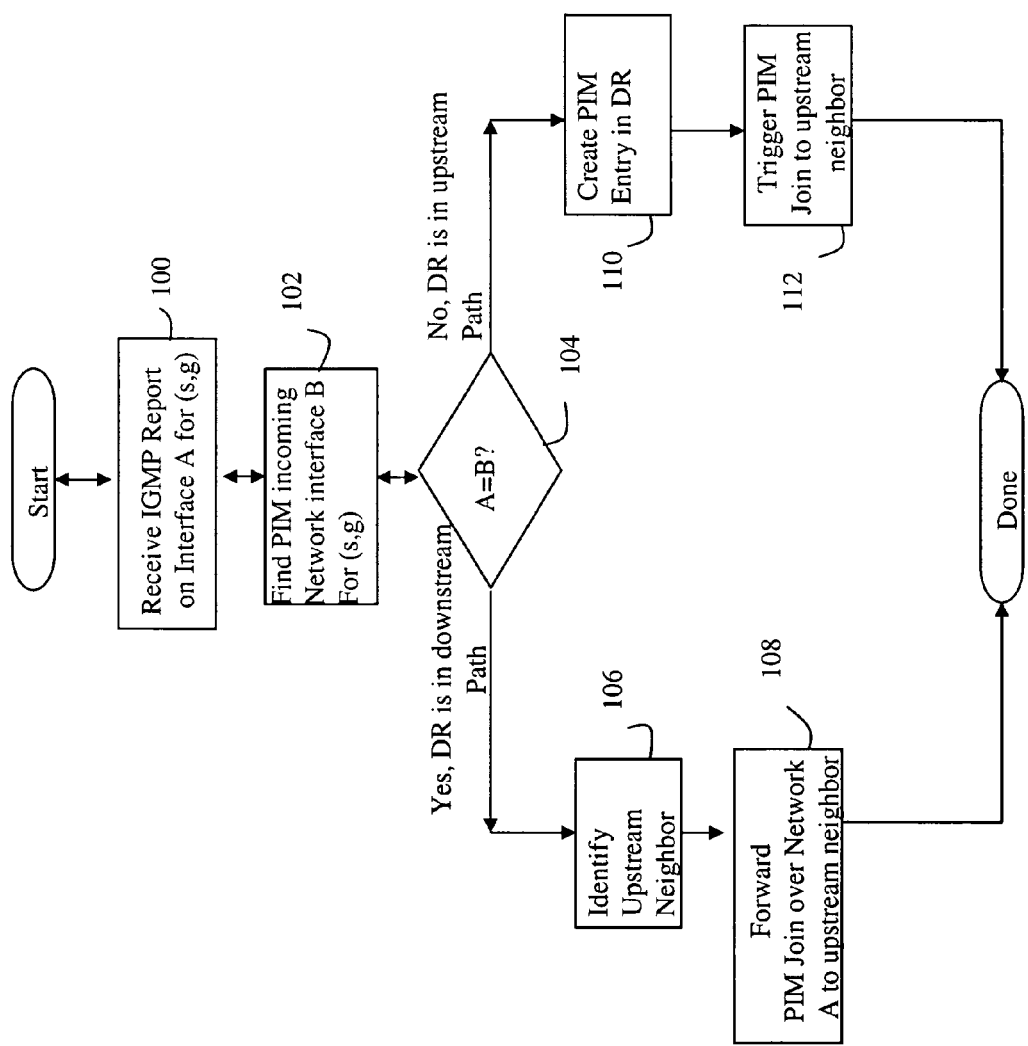
FIG. 3 is a flow diagram illustrating exemplary steps that may be taken in a process for translation of IGMP Report messages to PIM Join messages, and selective generation of a PIM entry in a routing table of the Designated Router.

Referring now to FIG. 3, a flow diagram illustrating steps that may be taken at a DR in response to receipt of an IGMP Report from a coupled IGMP Host will now be described. At step 100, the DR receives an IGMP Report on network interface A. In order to ascertain the appropriate handling of the IGMP Report, at step 102 the DR identifies which interface is the interface in which incoming PIM messages are received from the sender (Interface B). (i.e., that interface that is used to receive PIM messages from an upstream device for distribution to downstream devices by the DR). At step 104, interface A and interface B are compared for a match. If the interfaces match, interface A the same interface as interface B, and hence the IGMP report is forwarded from an upstream device, and the DR is in the downstream path. Thus, the DR should translate the IGMP Report to a PIM Join, and forward the Join to the upstream neighbor (steps 106 and 108). In one embodiment, the Join is sent to the upstream neighbor. However, this is not a limitation of the invention. Because interface A and interface B match, if there is no prior PIM entry, the DR does not generate one, as any multicast transmissions over the network interface will be seen by the IGMP Host and no forwarding by the Dr is necessary.

Figure 9:
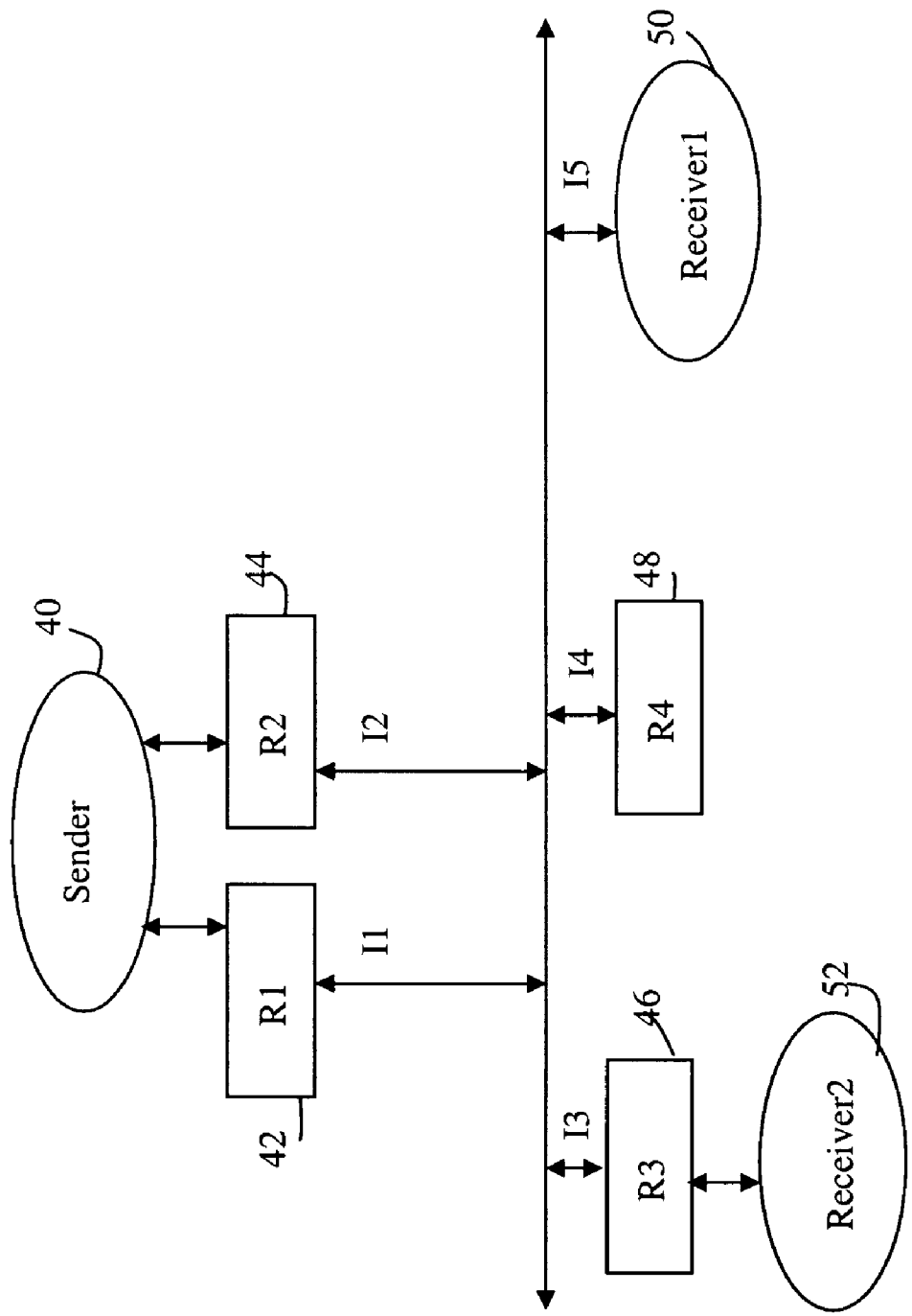
FIG. 9 is a block diagram including exemplary components in a multi-access system, and is used to describe processes of the present invention as illustrated in FIGS. 3-8.

For example, referring now to FIG. 9, assume that R4 is the DR, R1 is the upstream PIM neighbor, and Receiver1 issues an IGMP Report. R4, using the process of FIG. 3, translates the IGMP Report into a PIM Join, and forwards the Join to the upstream neighbor R1.

Referring back to FIG. 3, in the event that, at step 104 it is determined that interface A and B do not match, then the PIM incoming interface is different from the IGMP Host interface, and thus the DR is also upstream from the IGMP Host. In such a case, the DR will need to store forwarding information for handling multicast transmissions between sender and receiver, and therefore at step 110 creates a PIM entry based on the IGMP Host Report, and stores the entry in the multicast routing table. Then, at step 112, the DR forwards a PIM Join to the upstream PIM neighbor.

Referring back to FIG. 9, by way of example, assume that R1 is the DR, and that Receiver1 issues a IGMP Report. R1 determines that the upstream interface (towards the sender) is different from the interface on which the Report was received. R1 generates a PIM entry, based on the IGMP report, and triggers a PIM Join to the sender, to notify the sender of a new member of the group.

Figure 4:
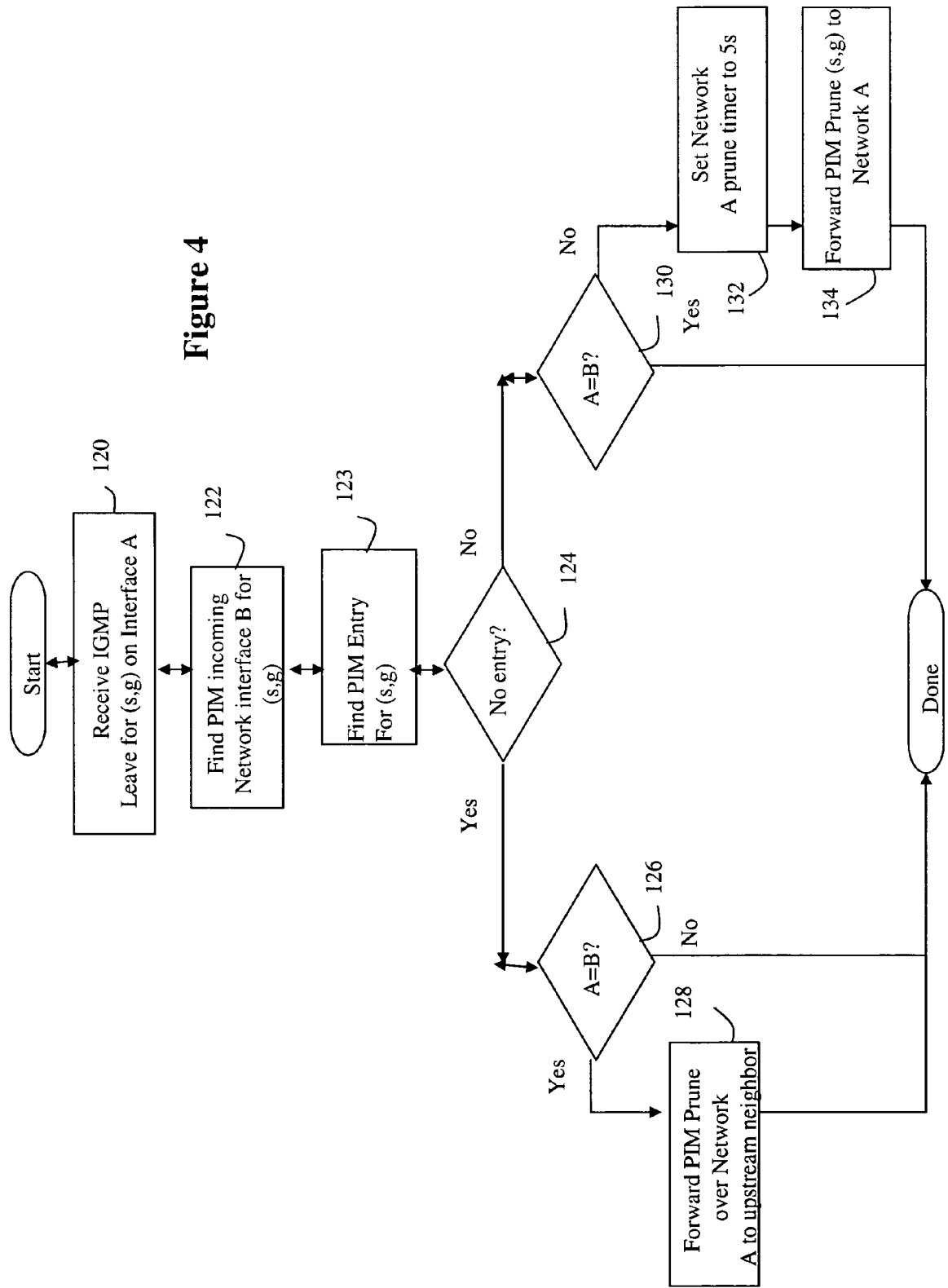
FIG. 4 is a flow diagram illustrating exemplary steps that may be taken in a process for translation of IGMP Leave messages to PIM Prune messages, and a process for selectively deleting a PIM entry from a routing table in the Designated Router.

Referring now to FIG. 4, exemplary steps that may be taken at a DR that receives a IGMP Leave message will now be described. At step 102, the IGMP Leave message is received on network interface A, and at step 104 the incoming PIM interface B is identified. At step 106, the multicast routing table is searched to determine whether there is a PIM entry corresponding to the Interface A (s, g) pair of the IGMP Leave message. If no entry exists, then at step 126 it is determined whether the DR is upstream from the IGMP Host issuing the Leave by comparing the value of Interface A with Interface B. If DR is in the downstream path, (A=B), then the DR issues a PIM Prune to the upstream neighbor on interface A. The process is then complete. Alternatively, if there was no entry (at step 124) and at step 126 it is determined that the DR is in the upstream path, no action is taken, as the DR already had the PIM entry pruned by other means.

For example, referring now to FIG. 9, Assume that R1 is the DR, and that Receiver1 issues an IGMP Leave. However, R1 has no PIM entry for the (s, g) pair for interface I1 (it may already have timed out, for example). Thus, R1 takes no action.

Referring back to FIG. 4, if at step 124 an entry does exist in the DR, then at step 130 it is determined whether the DR is in the downstream path. If it is (interface A=interface B), then the DR does nothing, as PIM entry was generated by a downstream device and should be maintained. For example, in FIG. 9 assume that R3 is the DR, and both Receiver1 and Receiver 2 are active members of a group. When joining the group, Receiver1 issued an IGMP Report, which was forwarded by R3, although R3 generated no entry (see steps 100-108 FIG. 3). When Receiver2 issued an IGMP Report, R3 generated a PIM entry for the (s,g) pair. If Receiver1 forwards an IGMP Leave, R3 checks its PIM table, which indicates that a downstream device is still a member of the group. Thus, R3 takes no action.

Referring back to FIG. 4, if, however, at step 130 it is determined that the DR is in the upstream path from the IGMP Host, then the Leave should potentially cause the PIM entry to be deleted. However, there may be other devices that are on the local network with the IGMP Host which are members of the multicast group, and thus the PIM entry should not be deleted. In such an embodiment, the DR sets the output interface (oif) delete timer for interface A to a predetermined time (for example, five seconds). This action will cause PIM entry to be deleted at the end of the time interval unless a Join stops the deletion. The DR forwards PIM Prune back over the interface on which the IGMP Leave was received (Interface A). Other devices on the network which see the PIM prune but have an active PIM entry for the (s, g) pair immediately forward a PIM Join to the DR, causing the oif delete time to be reset.

For example, referring again to FIG. 9, assume that both Receiver1 and Reciver2 are part of the multicast group associated with the sender. R1 is the DR. Receiver2 issued an IGMP report to join the group, causing a PIM entry to be created in R1 and R3. If Receiver1 issues an IGMP Leave, it is desirable that R1 does not delete the PIM entry, since it would disrupt communication between Receiver2 and the sender. Thus, when R1 receives the IGMP Leave, it sets the oif-delete timer, to delete the PIM entry, and forwards the PIM Prune over interface I1. R3 sees the PIM Prune on interface I1, and immediately forwards a PIM Join to the DR R1, causing the I1 delete timer to be reset.

Thus, several processes have been shown and described for appropriate handling of IGMP member messages. However, several of the above concepts can additionally be applied to intelligently control the transmission of member messages over the networks to reduce unnecessary traffic and PIM entry generation for any multicast PIM router (not just the Designated Routers). For example, FIGS. 5 and 6 illustrate steps that may be taken to consolidate information to expedite PIM Prune handling.

Figure 5:
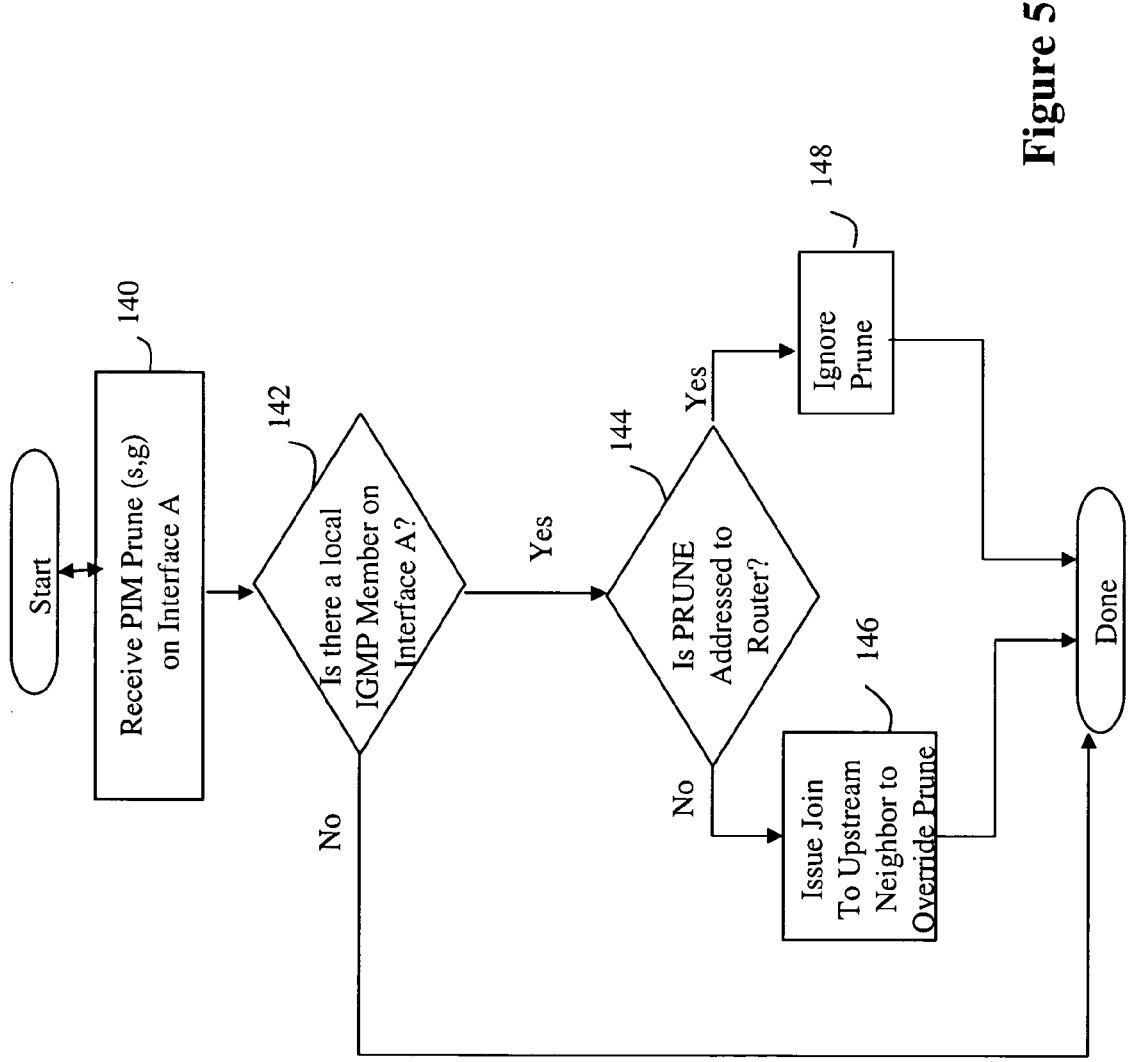
FIG. 5 is a flow diagram illustrating exemplary steps that may be taken at a DR of the present invention to determine response to receipt of a PIM prune message.
Figure 6:
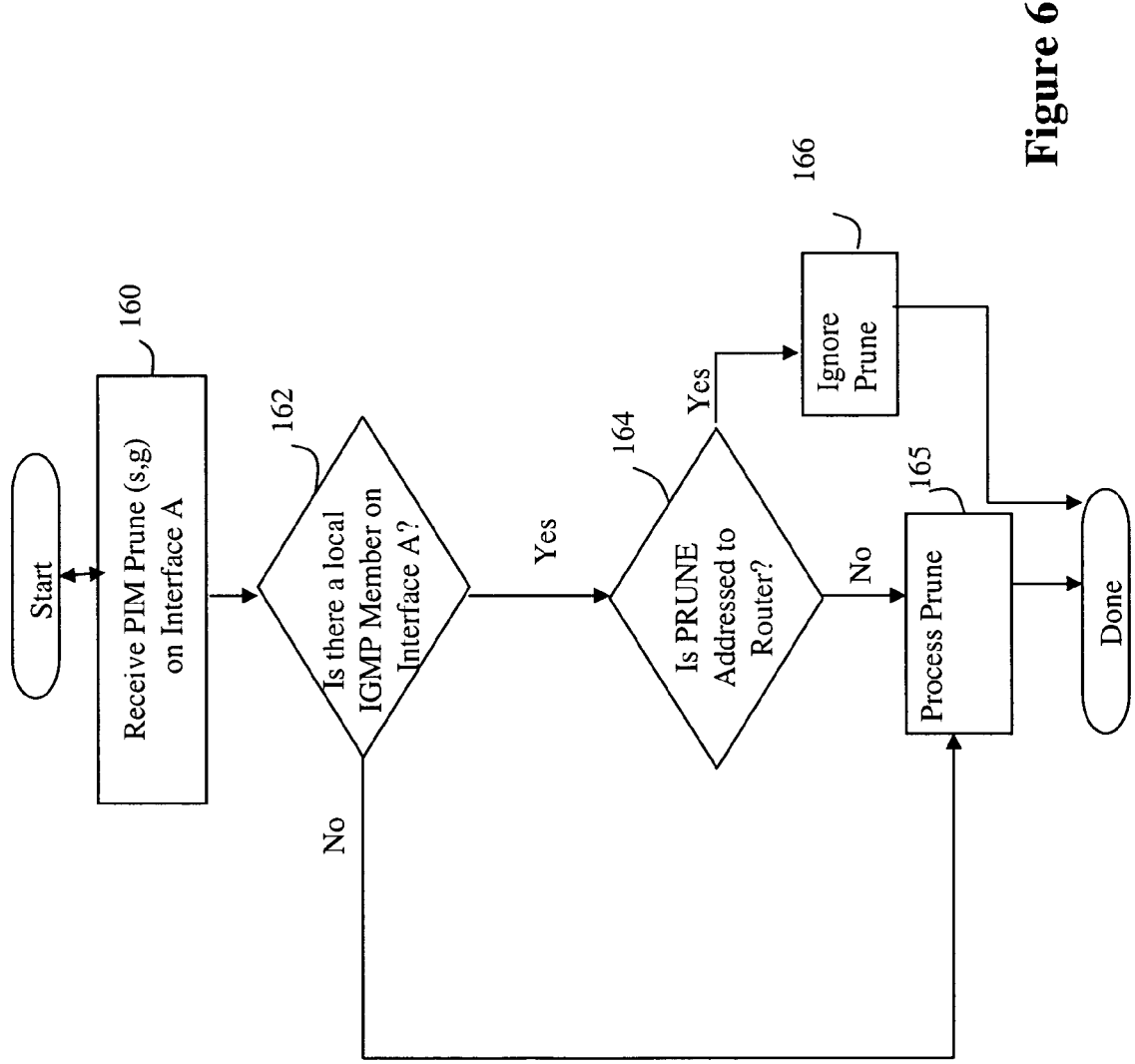
FIG. 6 is a flow diagram of an alternate process that may be taken at a DR of the present invention to determine response to receipt of a PIM prune message.

In FIG. 5, at step 140 assume a PIM Prune is received at interface A of a multicast router. Thus, at step 142 it is determined whether there is local IGMP (s,g) pair on interface A, and thus whether a PIM entry is stored for the pair. At step 142, it is determined whether the router is the intended recipient of the PIM Prune. If it is the recipient, the router knows that it does not want to prune, due to the existence of the local IGMP Host. Thus, at step 148 the router ignores the prune. Otherwise, if the router is not the source of the PIM Prune, it issues a Join to the upstream neighbor to override the Prune and maintain the communication path with the local IGMP Host.

For example, referring again to FIG. 9, assume that R1 is the DR, and Receiver1 and Receiver2 are part of a group. Receiver 2 forwards an IGMP Report, causing both R1 and R3 to have the (s,g) entry. Receiver1 also sent the same Report. Then Receiver2 issues an IGMP Leave, causing R3 to forward a PIM Prune to R1. However, R1, stores, in its PIM Routing table, a PIM entry for the local IGMP Host, Receiver1, and therefore drops the PIM Prune.

However, if R4 is the DR in the above example, R1 (as an upstream neighbor), R3 and R4 each include PIM entries. If Receiver2 issues an IGMP Leave, and R3 issues a PIM Prune, R4 will issue a PIM Join to override the Prune at R1.

Figure 7:
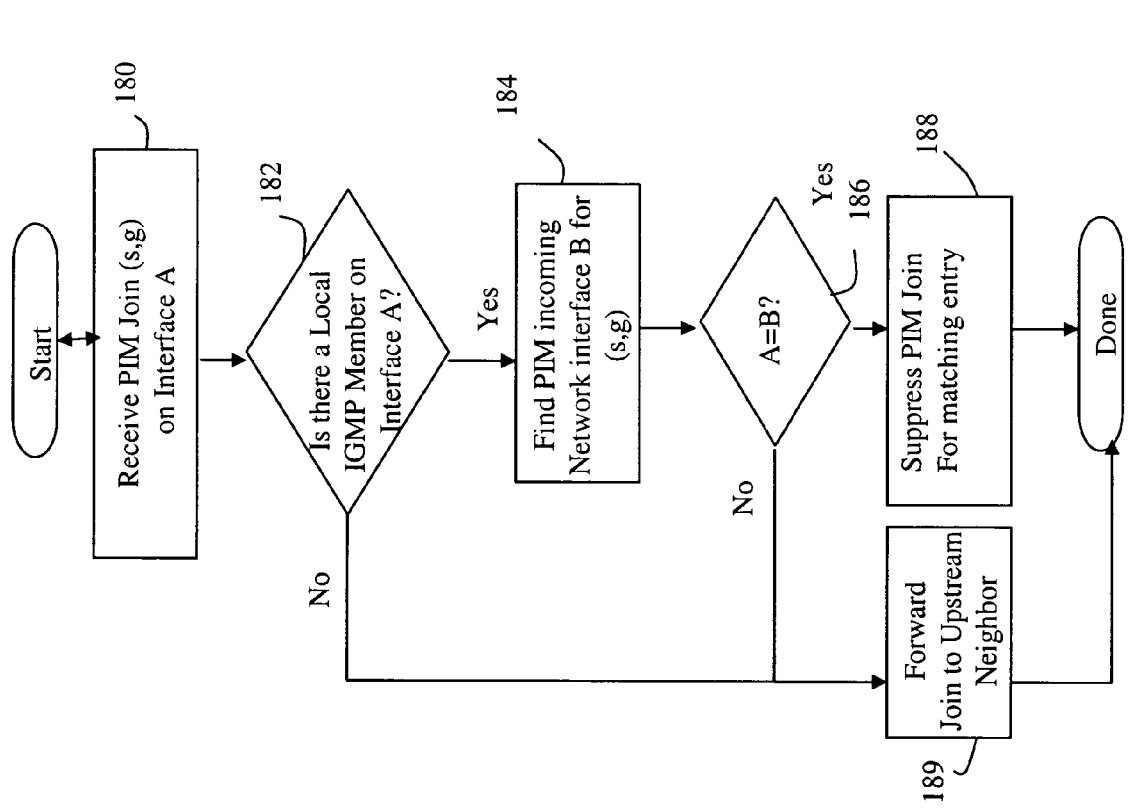
FIG. 7 is a flow diagram illustrating exemplary steps that may be optionally performed at a DR in response to a receipt of a PIM join.

An alternative process for handling the PIM Prune is illustrated in FIG. 6. Assume, that all IGMP routers (not just the IGMP Querier, or a DR) on the same LAN save group information. In such an instance, the process includes the steps of receiving the PIM Prune and determining whether there is a local IGMP (s,g) member at step 162, and determining at step 164 whether the Prune is directed at the router receiving the Prune. If it is, and the router is storing a PIM entry for a local IGMP host, then the router drops the Prune. Alternatively, if the Prune is not directed at the router, or there is no local IGMP (s,g) member, then the router process proceeds to step 165, where the prune is processed normally at the router, either by dropping the Prune or sending a Join to override the prune. Referring now to FIG. 7, a process that reduces the forwarding of member messaging is shown. At step 180, a PIM join is received on interface A of a DR. At step 182, the DR determines whether there is already a local IGMP member for interface A. If so, the PIM input interface B is determined at 184. If at step 186 it is determined that interface A is the same as interface B, then the DR is in the downstream path, and the device issuing the PIM join is on the same network as the PIM incoming message network. Thus, any previous Joins for the (s,g) pair have already been broadcast on the network, due to the existence of local IGMP (s,g) membership info, and at step 188 the DR can suppress the forwarding of the Join to the upstream neighbor. If either there was no existing PIM entry, or interface A was not equal to interface B, the PIM join is forwarded to the upstream path at step 189.

Thus, in FIG. 9, both Receiver1 and Receiver 2 send an (s,g) join. This triggers both R1 and R3 to create the PIM entry. R3 will periodically send the PIM Join for Receiver2. R4, the Designated Router, periodically sends the PIM join to R1 for Receiver1. However, this periodic Join by R4 can be advantageously suppressed if the periodic Join by R3 is seen by R4 just before sending the periodic Join.

Figure 8:
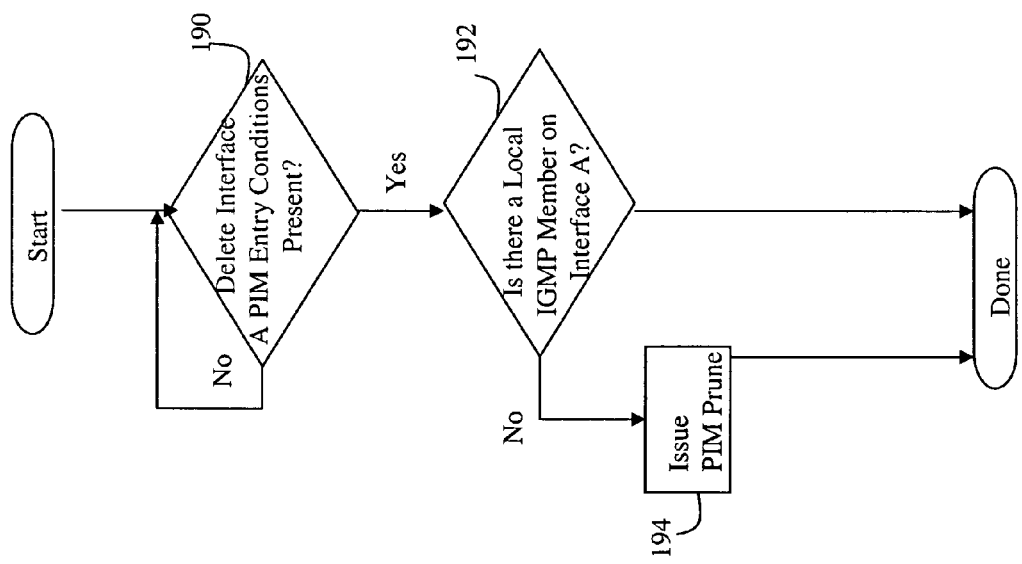
FIG. 8 is a flow diagram illustrating exemplary steps that may be optionally performed at a DR in response the receipt of a PIM prune.

In FIG. 8, a process for precluding PIM entries from being prematurely deleted is provided. At step 190, the process waits until a delete PIM entry condition is present. Such a condition could be, for example, a timeout of the PIM entry, or the loss of one of the network interfaces, among other reasons known to those of skill in the art. When a PIM entry delete condition is detected at step 190, at step 192 local IGMP membership info is examined to determine whether there is a local IGMP Host having the (s,g) pair associated with the interface. If so, no action is taken with regard to pruning the entry in the router or any upstream routers. If there is no IGMP Host having the (s,g) pair in the multicast routing table, a PIM prune is issued over the network interface for the (s,g) pair.

Thus, in FIG. 9, assume that Receiver2 and Receiver1 both issue an IGMP Host Report, R3 is the DR and R1 is the upstream neighbor. In response to the IGMP Reports, both R1 and R3 have (s,g) entries for the I1 interface. If Receiver 2 sends an IGMP Leave, R3 loses its last interface, and thus the PIM entry. R3 would send a PIM Prune to R1, but instead examines the multicast routing table, and determines that a local IGMP Host (Receiver1) also has the (s,g) pair on the interface. Thus, R3 suppresses the PIM Prune.

Accordingly, several processes have been shown and described for controlling the creation and deletion of PIM entries, and forwarding of PIM member messaging, to integrate IGMP functionality into a PIM protocol without the problems of the prior art. By including PIM entries within the DR that reflect the present state of the IGMP Host membership, a DR can more readily ascertain remaining group membership, without having to wait out periodic reports from the IGMP Hosts. As a result, the DR can quickly ascertain remaining group membership in the event of a received Join or Prune commands, and immediately forward the commands upstream as needed. In addition, several PIM message handling optimization have been described that intelligently analyze the contents of the PIM entries to reduce unnecessary group message forwarding, thereby further optimizing the performance of the DR.

The above description and Figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition, the present invention is not limited to only the use of a particular version of IGMP and PIM protocols that are described, but may be used with other protocols, including but not limited to IGMP Versions 2, PIM-Sparse Mode, PIM Source Specific Multicast, and IPV6. Thus, the description of a process with regard to a particular protocol is not limited to the described protocol, but may be extended to cover any co-existing multicasting protocols.

FIGS. 3-9 are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

The invention claimed is:

1. A method of maintaining consistent group membership data at a Designated Router executing the Protocol Independent Multicast (PIM) protocol including the steps of:
   receiving, at the Designated Router, an IGMP membership message from an IGMP host operating according to the Internet Group Multicast Protocol (IGMP) protocol;
   translating the IGMP membership message into a PIM membership message; and
   selectively forwarding the PIM membership message to a device upstream from the Designated Router, including delaying forwarding a PIM prune message in response to an IGMP Leave if the Designated Router is in the upstream path from the IGMP host.

2. The method according to claim 1, wherein the step of selectively forwarding further includes the steps of:
   determining whether the designated router is upstream from the host device; and
   responsive to a determination that the designated router is upstream from the host device, modifying an entry in a PIM routing table associated with the IGMP host responsive to the IGMP membership message.

3. The method according to claim 2, wherein the IGMP membership message indicates that a member is joining a multicast group, and the step of modifying includes the step of generating and storing a PIM entry in a multicast routing table responsive to information in the IGMP membership message.

4. The method of claim 1, wherein the IGMP membership message is a Report message, including an identifier and network interface for a member of a group, and where the step of translating translates the Report message into a PIM Join message.

5. The method of claim 1, wherein the IGMP membership message is a Leave message, indicating an identifier and network interface for a member leaving a group, and wherein the step of translating converts the Leave message to a PIM Prune message.

6. A method of maintaining consistent group membership data at a Designated Router executing the Protocol Independent Multicast (PIM) protocol including the steps of:
   receiving, at the Designated Router, an IGMP membership message from an IGMP Host device operating according to the Internet Group Multicast Protocol (IGMP) protocol;
   determining whether an entry in a PIM routing table corresponds to information in the IGMP membership message;
   translating the IGMP membership message into a PIM membership message; and
   selectively forwarding the PIM membership message to a device upstream from the Designated Router, including delaying forwarding a PIM prune message in response to an IGMP Leave if the Designated Router is in the upstream path from the IGMP host.

7. The method of claim 6, wherein the step of selectively forwarding the PIM membership message operates in response to whether the entry exists in the routing table and in response to whether the designated router is upstream from the IGMP Host device.

8. The method of claim 7, wherein the IGMP protocol message indicates that a member is leaving a group, and wherein the PIM membership message indicates removal of the member from the group, and wherein the method further includes the step of delaying removal of the member from the group at the designated router for a predetermined time period.

9. The method according to claim 6, wherein the designate router forwards the PIM membership message on the network interface on which the IGMP membership message is received.

10. A method of maintaining consistent group membership data at a Router executing the Protocol Independent Multicast (PIM) protocol including the steps of:
   receiving a PIM membership message on a first interface, the membership message identifying a (source,group) pair;
   searching a multicast routing table to determine whether an entry corresponding to the (source,group) pair and associated with a coupled IGMP Host is stored in the multicast routing table; and
   selectively processing the PIM membership message responsive to whether the entry is stored in the routing table, including not processing a PIM prune message if a local IGMP host exists.

11. The method according to claim 10, further responsive to whether the PIM membership message is addressed to the Router.

12. The method according to claim 11, further including the step of only forwarding the PIM membership message if the PIM message is addressed to the Router and an entry is stored in the routing table.

13. The method according to claim 10, further including the step of determining whether the IGMP Host is downstream from the Router.

14. The method according to claim 10, further including the step of suppressing forwarding of the PIM membership message in response to the entry being stored in the routing table and the IGMP Host not being downstream from the Router.

15. The method according to claim 10, further including the step of forwarding of the PIM membership message in response to the entry being stored in the routing table and the IGMP Host being downstream from the Router.

16. A router comprising:
   a routing table, the routing table including at least two entries including information for forwarding PIM multicast messages;
   a network interface for receiving messages from a neighboring device, the messages including IGMP Host messages;
   translation logic for converting IGMP Host messages received from the network interface to PIM messages; and
   forwarding logic for selectively forwarding the translated PIM messages to neighboring upstream devices, including delaying forwarding a PIM prune message in response to an IGMP Leave if the Designated Router is in the upstream path from the IGMP host.

* * * * *